US007860130B2

(12) United States Patent
Tsao et al.

(10) Patent No.: US 7,860,130 B2
(45) Date of Patent: Dec. 28, 2010

(54) COMMUNICATING SIGNALS THROUGH TWO TWISTED PAIRS

(75) Inventors: Shoujung J. Tsao, Fremont, CA (US); Roger W. Hsu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 11/958,479

(22) Filed: Dec. 18, 2007

(65) Prior Publication Data

US 2009/0154535 A1 Jun. 18, 2009

(51) Int. Cl.
*H04L 5/14* (2006.01)
(52) U.S. Cl. ........................................ 370/481; 370/254
(58) Field of Classification Search ................ 370/468, 370/480, 245; 375/220–222
See application file for complete search history.

(56) References Cited

U.S. PATENT DOCUMENTS

2005/0213648 A1* 9/2005 Chow .......................... 375/222

2007/0153835 A1* 7/2007 Khasnis ....................... 370/493

OTHER PUBLICATIONS

PCT Notification of Transmittal of the International Search Report and the Written Opinion of this International Searching Authority, Applicant's File Reference F-953771C-PC, International Application No. PCT/US2008/086763, 9 pages, Apr. 2, 2009.
Pending U.S. Appl. No. 11/500,822 entitled, *"Methods and Systems For a Customer Premise Equipment to Reverse the Upstream Speed and Downstream Speed of a Network Connection"*, 29 pages specification, claims and abstract, 7 pages of drawings, filed Aug. 7, 2006.

* cited by examiner

*Primary Examiner*—Derrick W Ferris
*Assistant Examiner*—Jose Villa
(74) *Attorney, Agent, or Firm*—Baker Botts L.L.P.

(57) ABSTRACT

In one embodiment, a method includes communicating with a Digital Subscriber Line (DSL) transceiver unit through a first twisted pair that comprises a first plurality of wires, and communicating with the DSL, transceiver unit through a second twisted pair that comprises a second plurality of wires. A training procedure is implemented to receive first signals from the DSL transceiver unit through the first plurality of wires of the first twisted pair, and to send second signals to the DSL transceiver unit through the second plurality of wires of the second twisted pair.

24 Claims, 2 Drawing Sheets

US 7,860,130 B2

COMMUNICATING SIGNALS THROUGH TWO TWISTED PAIRS

TECHNICAL FIELD

The present disclosure relates generally to communication networks.

BACKGROUND

Digital subscriber line (DSL) technology transmits digital data over telephone lines. The telephone lines typically communicate signals between customer premises equipment (CPE) and a digital subscriber line access multiplexer (DSL access multiplexer or DSLAM). Upstream signals go from the customer premises equipment to the DSL access multiplexer, and downstream signals go from DSL access multiplexer to the customer premises equipment. One band may be allocated for upstream signals, and another band may be allocated for downstream signals.

DESCRIPTION OF EXAMPLE EMBODIMENTS

Overview

In one embodiment, a method includes communicating with a Digital Subscriber Line (DSL) transceiver unit through a first twisted pair that comprises a first plurality of wires, and communicating with the DSL transceiver unit through a second twisted pair that comprises a second plurality of wires. A training procedure is implemented to receive first signals from the DSL transceiver unit through the first plurality of wires of the first twisted pair, and to send second signals to the DSL transceiver unit through the second plurality of wires of the second twisted pair.

Description

Figure 1:
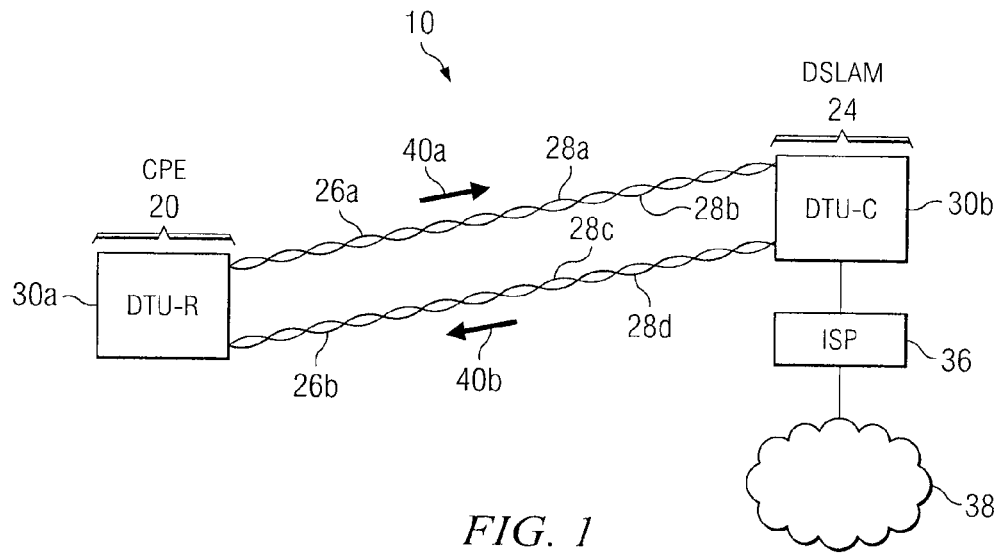
FIG. 1 illustrates an example of a system operable to communicate signals through two twisted pairs.

FIG. 1 illustrates an example of a system 10 operable to communicate signals through two twisted pairs. In the example, system 10 implements a training procedure to communicate upstream signals through one twisted pair and downstream signals through another twisted pair.

In the example, system 10 communicates according to Digital Subscriber Line (DSL) technology that transmits digital data over telephone lines. Examples of DSL technology include Asymmetric Digital Subscriber Line (ADSL) and Very high speed DSL (VDSL) technology. In the illustrated embodiment, system 10 includes customer premises equipment (CPE) 20, a digital subscriber line access multiplexer (DSL access multiplexer or DSLAM) 24, an Internet service provider (ISP) 36, and a packet network 38 coupled as shown. CPE 20 and DSLAM 24 are coupled by twisted pairs 26 (26a and/or 26b) and include DSL transceiver units (DTUs) 30 (30a and/or 30b).

In the example, CPE 20 represents equipment of a subscriber, such as a terminal and associated equipment. Examples of CPE 20 include telephones, modems (such as DSL or cable modems), set-top boxes, key phone systems, private branch exchanges, and/or other customer equipment. DSLAM 24 couples one or more DSL telephone lines to a packet service, such as an Internet service. Internet service provider 36 provides access to packet network 38. Packet network 38 represents a network operable to communicate information in packets. An example of packet network 38 includes an Internet network.

In the example, CPE 20 includes a remote DTU (DTU-R) 30a, and DSLAM 24 includes a central ADSL transceiver unit (DTU-C) 30b. In general, a DSL transceiver unit, or DSL modem, couples equipment to an ADSL telephone line to use a DSL service. As an example, an ADSL transceiver unit (ATU) is coupled to an ADSL line to use an ADSL service. In one embodiment, a DTU 30 has a four-wire capability. That is, DTU 30 is able to communicate upstream signals through one twisted pair 26 and downstream signals through another twisted pair 26.

In the example, twisted pairs 26 communicate signals 40 between DTU-R 30a of CPE 20 and DTU-C 30b of DSLAM 24. Twisted pairs 26 include first twisted pair 26a and second twisted pair 26b. A twisted pair 26 comprises two twisted conductors, such as wires 28 (28a, 28b, 28c, and/or 28d). First twisted pair 26a comprises a first-first wire 28a and a second-first wire 28b, and second twisted pair 26b comprises a first-second wire 28c and a second-second wire 28d.

Signals 40 (40a and/or 40b) may communicate information. Information may refer to voice, data, text, audio, video, multimedia, control, signaling, other information, or any combination of any of the preceding. The signals may communicate information in packets such as asynchronous transfer mode (ATM) cells or packet transfer mode (PTM) packets.

Upstream signals 40a are communicated from CPE 20 to DSLAM 24, and downstream signals 40b are communicated from DSLAM 24 to CPE 20. A twisted pair 26 may communicate either upstream signals 40a or downstream signals 40b using a band from approximately 25.875 kilohertz (kHz) to 1104 kHz.

In the illustrated example, a twisted pair 26 communicates either upstream signals 40a or downstream signals 40b using a band from approximately 25.875 kHz to 1104 kHz. For example, twisted pair 26a communicates upstream signals 40a, and twisted pair 26b communicates downstream signals 40b.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

System 10 may utilize communication protocols and technologies to communicate signals. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, and/or other standards.

Modifications, additions, or omissions may be made to system 10 without departing from the scope of the invention. The components of system 10 may be integrated or separated. Moreover, the operations of system 10 may be performed by more, fewer, or other components. For example, the operations of a DTU 30 may be performed by more than one component. Additionally, operations of system 10 may be performed using any suitable logic. As used in this document, "each" refers to each member of a set or each member of a subset of a set.

Figure 2:
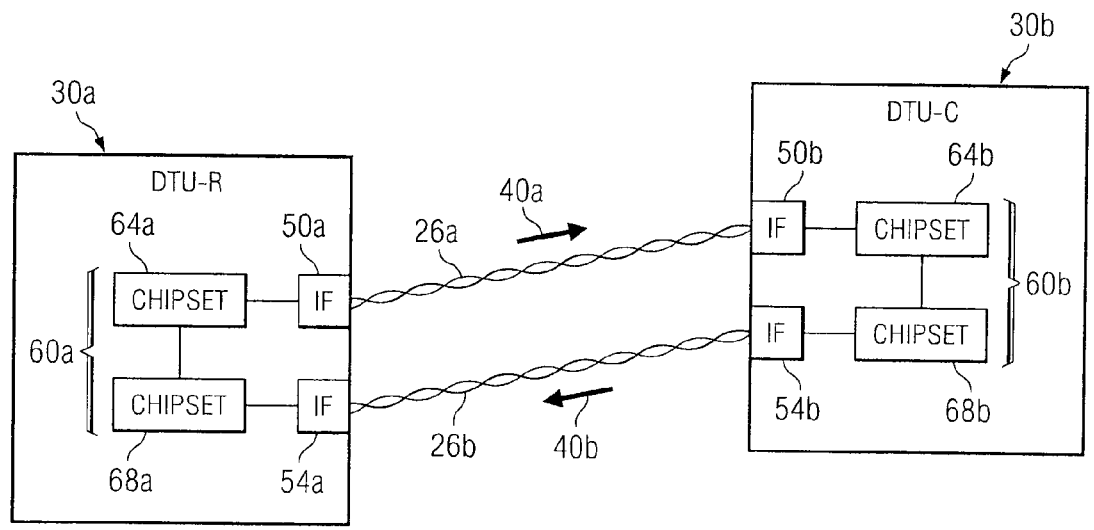
FIG. 2 illustrates examples of DSL transceiver units (DTUs) and twisted pairs that may be used with the system of FIG. 1.

FIG. 2 illustrates examples of DTUs 30 and twisted pairs 26 that may be used with system 10 of FIG. 1. DTUs 30 implement a training procedure to communicate upstream signals 40$a$ through twisted pair 26$a$ and downstream signals 40$b$ through twisted pair 26$b$.

In the illustrated embodiment, each DTU 30 includes an interface 50 (50$a$ and/or 50$b$), an interface 54 (54$a$ and/or 54$b$), and logic (60$a$ and/or 60$b$). For example, DTU-R 30$a$ includes interface 50$a$, interface 54$a$, and logic 60$a$, and DTU-C 30$b$ includes interface 50$b$, interface 54$b$, and logic 60$b$. Interfaces 50 couple to twisted pair 26$a$ to communicate upstream signals 40$a$ along twisted pair 26$a$. Interfaces 54 couple to twisted pair 26$b$ to communicate downstream signals 40$b$ along twisted pair 26$b$.

Logic 60 is embodied in one or more tangible media and implements a training procedure when executed. The training procedure trains DTUs 30 to communicate upstream signals 40$a$ through wires 28$a$ and 28$b$ of twisted pair 26$a$ and downstream signals 40$b$ through wires 28$c$ and 28$d$ of twisted pair 26$b$. For example, the training procedure may train DTU-R 30$a$ to send upstream signals 40$a$ through wires 28$a$ and 28$b$ and to receive downstream signals 40$b$ through wires 28$c$ and 28$d$. The training procedure may train DTU-C 30$b$ to send downstream signals 40$b$ through 28$c$ and 28$d$ and to receive upstream signals 40$a$ through wires 28$a$ and 28$b$.

Logic 60 includes one or more chipsets 64 (64$a$ and/or 64$b$) and/or 68 (68$a$ and/or 68$b$). In the illustrated embodiment, logic 60 includes two chipsets 64 and 68, where chipset 64 is coupled to twisted pair 26$a$ and chipset 68 is coupled to twisted pair 26$b$. Logic 60, however, may include any suitable number of chipsets. A chipset 64 and/or 68 includes one or more integrated circuits.

In general, a training procedure may be implemented by logic 60 such as chipsets 64 and/or 68 by sending messages that include instructions to train the DTUs 30. In one embodiment, DTU-C 30$b$ may send instructions to train chipsets 64$a$ and 68$a$ of DTU-R 30$a$. Chipset 64$a$ may be instructed to send upstream signals through twisted pair 26$a$, and chipset 68$a$ may be instructed to receive downstream signals through twisted pair 26$b$. In another embodiment, DTU-R 30$a$ may send instructions to train chipsets 64$b$ and 68$b$ of DTU-C 30$b$. Chipset 64$b$ may be instructed to receive upstream signals through twisted pair 26$a$, and chipset 68$b$ may be instructed to send downstream signals through twisted pair 26$b$ Modifications, additions, or omissions may be made to DTU 30 without departing from the scope of the invention. The components of DTU 30 may be integrated or separated. Moreover, the operations of DTU 30 may be performed by more, fewer, or other components. For example, the operations of chipsets 64 and 68 may be performed by one component, or the operations of chipset 64 or 68 may be performed by more than one component. Additionally, operations of DTU 30 may be performed using any suitable logic comprising software, hardware, and/or other logic.

Figure 3:
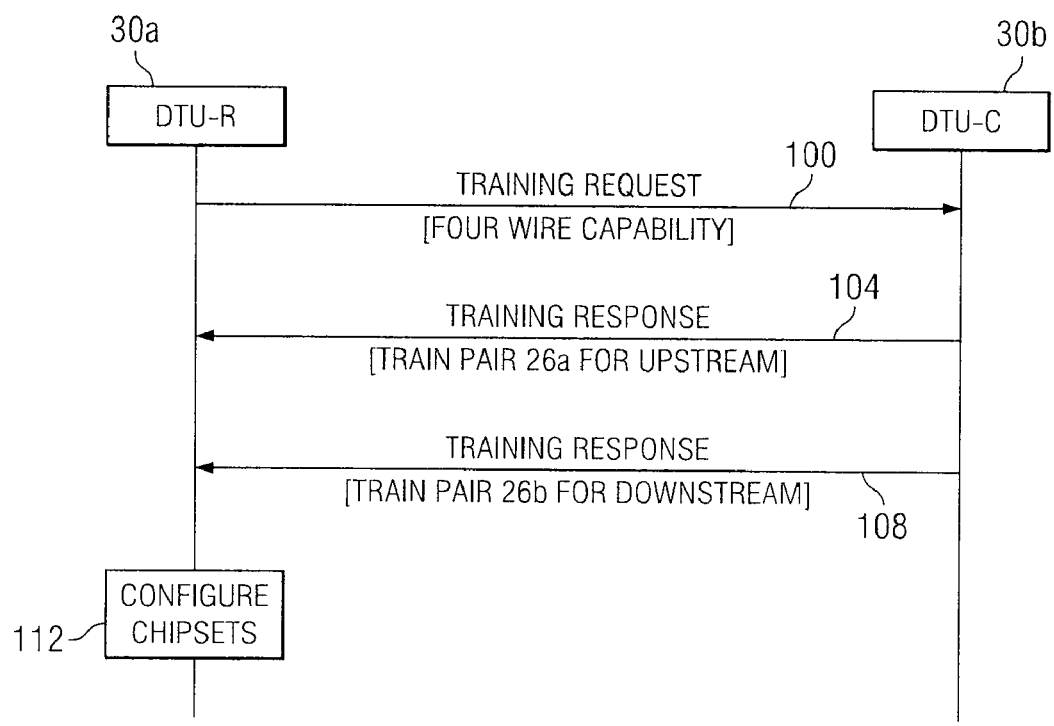
FIG. 3 illustrates an example of a method for implementing a training procedure that may be used by the DTUs of FIGS. 1 and 2.

FIG. 3 illustrates an example of a method for implementing a training procedure that may be used by DTUs 30 of FIGS. 1 and 2. In the example, DTU-R 30$a$ sends a training request to DTU-C 30$b$ at step 100. The training request requests training, and indicates that DTU-R 30$a$ has four-wire capability, that is, has the ability to communicate upstream signals 40$a$ through one twisted pair 26 and downstream signals 40$b$ through another twisted pair 26.

Step 104 and 108 describe implementation of a training procedure to train DTU-R 30$a$. DTU-C 30$b$ sends a training response at step 104. The training response instructs DTU-R 30$a$ to send upstream signals 40$a$ through wires 28$a$ and 28$b$ of twisted pair 26$a$. The training response may also instruct DTU-R 30$a$ to send upstream signals 40$a$ at a first data rate, such as a rate in the range of 500 kbit/s to 10 Mbit/s, for example, 800 kbit/s.

DTU-C 30$b$ sends another training response at step 108. The training response instructs DTU-R 30$a$ to receive downstream signals 40$b$ through wires 28$c$ and 28$d$ of twisted pair 26$b$. The training response may also instruct DTU-R 30$a$ to receive downstream signals 40$b$ at a second data rate, such as a rate in the range of 500 kbit/s to 10 Mbit/s, for example, 8 Mbit/s.

DTU-R 30$a$ configures chipsets 64$a$ and 68$a$ in response to the instructions at step 112. Chipset 64$a$ is configured to send upstream signals 40$a$ through twisted pair 26$a$, and chipset 68$a$ is configured to receive downstream signals 40$b$ through twisted pair 26$b$.

Modifications, additions, or omissions may be made to the method without departing from the scope of the invention. The method may include more, fewer, or other steps. Additionally, steps may be performed in any suitable order.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. An apparatus, comprising:
   a first interface configured to communicate with a Digital Subscriber Line (DSL) transceiver unit through a first twisted pair, the first twisted pair comprising a first plurality of wires;
   a second interface configured to communicate with the DSL transceiver unit through a second twisted pair, the second twisted pair comprising a second plurality of wires; and
   logic embodied in one or more tangible media for execution and when executed configured to:
   receive a plurality of first signals from the DSL transceiver unit through the first plurality of wires of the first twisted pair;
   send a plurality of second signals to the DSL transceiver unit through the second plurality of wires of the second twisted pair, and send one or more messages through the first twisted pair or the second twisted pair to the DSL transceiver unit the one or more messages comprising:
- a first instruction to receive the plurality of first signals through the first plurality of wires of the first twisted pair; and
- a second instruction to send the plurality of second signals through the second plurality of wires of the second twisted pair.

2. The apparatus of claim 1, wherein:
the DSL transceiver unit comprises a central DSL transceiver unit;
the plurality of first signals comprises a plurality of downstream signals; and
the plurality of second signals comprises a plurality of upstream signals.

3. The apparatus of claim 1, wherein:
the DSL transceiver unit comprises a remote DSL transceiver unit;
the plurality of first signals comprises a plurality of upstream signals; and the plurality of second signals comprises a plurality of downstream signals.

4. The apparatus of claim 1, the logic further configured to receive the plurality of first signals using a band from approximately 25.875 kilohertz (kHz) to 1104 kHz.

5. The apparatus of claim 1, the logic further configured to send the plurality of second signals using a band from approximately 25.875 kilohertz (kHz) to 1104 kHz.

6. The apparatus of claim 1, the logic further configured to send one or more messages to the DSL transceiver unit, the one or more messages comprising:
- a first instruction to receive the plurality of first signals at a first data rate; and
- a second instruction to send the plurality of second signals at a second data rate.

7. The apparatus of claim 1, wherein the logic comprises:
- a first chipset configured to receive the plurality of first signals through the first plurality of wires of the first twisted pair; and
- a second chipset configured to send the plurality of second signals through the second plurality of wires of the second twisted pair.

8. The apparatus of claim 1, wherein the logic comprises a chipset configured to:
- receive the plurality of first signals through the first plurality of wires of the first twisted pair; and
- send the plurality of second signals through the second plurality of wires of the second twisted pair.

9. The apparatus of claim 1, wherein the DSL transceiver unit comprises an asynchronous DSL (ADSL) transceiver unit.

10. A method, comprising:
communicating with a Digital Subscriber Line (DSL) transceiver unit through a first twisted pair, the first twisted pair comprising a first plurality of wires;
communicating with the DSL transceiver unit through a second twisted pair, the second twisted pair comprising a second plurality of wires;
sending one or more messages, through the first twisted pair or the second twisted pair, to the DSL transceiver unit the one or more messages comprising:
a first instruction to receive the plurality of first signals through the first plurality of wires of the first twisted pair and
a second instruction to send the plurality of second signals through the second plurality of wires of the second twisted pair;
receiving a plurality of first signals from the DSL transceiver unit through the first plurality of wires of the first twisted pair; and
sending a plurality of second signals to the DSL transceiver unit through the second plurality of wires of the second twisted pair.

11. The method of claim 10, wherein:
the DSL transceiver unit comprises a central DSL transceiver unit;
the plurality of first signals comprises a plurality of downstream signals; and the plurality of second signals comprises a plurality of upstream signals.

12. The method of claim 10, wherein:
the DSL transceiver unit comprises a remote DSL transceiver unit;
the plurality of first signals comprises a plurality of upstream signals; and the plurality of second signals comprises a plurality of downstream signals.

13. The method of claim 10, wherein receiving the plurality of first signals further comprises:
receiving the plurality of first signals using a band from approximately 25.875 kilohertz (kHz) to 1104 kHz.

14. The method of claim 10, wherein sending the plurality of second signals further comprises:
sending the plurality of second signals using a band from approximately 25.875 kilohertz (kHz) to 1104 kHz.

15. The method of claim 10, further comprising sending one or more messages to the DSL transceiver unit, the one or more messages comprising:
a first instruction to receive the plurality of first signals at a first data rate; and
a second instruction to send the plurality of second signals at a second data rate.

16. The method of claim 10, further comprising using:
a first chipset configured to receive the plurality of first signals through the first plurality of wires of the first twisted pair; and
a second chipset configured to send the plurality of second signals through the second plurality of wires of the second twisted pair.

17. The method of claim 10, further comprising using a chipset configured to:
receive the plurality of first signals through the first plurality of wires of the first twisted pair; and
send the plurality of second signals through the second plurality of wires of the second twisted pair.

18. The method of claim 10, wherein the DSL transceiver unit comprises an asynchronous DSL (ADSL) transceiver unit.

19. The method of claim 10, further comprising implementing a training procedure to:
receive the plurality of first signals from the DSL transceiver unit through the first plurality of wires of the first twisted pair; and
send the plurality of second signals to the DSL transceiver unit through the second plurality of wires of the second twisted pair.

20. A system, comprising:
a central Digital Subscriber Line (DSL) transceiver unit;
a remote DSL transceiver unit;
a first twisted pair comprising a first plurality of wires, the first twisted pair coupled to the central DSL transceiver unit and the remote DSL transceiver unit; and
a second twisted pair comprising a second plurality of wires, the second twisted pair coupled to the central DSL transceiver unit and the remote DSL transceiver unit;

the central DSL transceiver unit configured to send a plurality of downstream signals to the remote DSL transceiver unit through the first plurality of wires; and the remote DSL transceiver unit configured to send a plurality of upstream signals to the central DSL transceiver unit through the second plurality of wires, the remote DSL transceiver unit further configured to send one or more messages, through the first twisted pair or the second twisted pair, to the central DSL transceiver unit, the one or more messages comprising:

a first instruction to receive the plurality of first signals through the first plurality of wires of the first twisted pair and a second instruction to send the plurality of second signals through the second plurality of wires of the second twisted pair.

21. The system of claim 20, wherein the central DSL transceiver unit comprises:

a first chipset configured to receive the plurality of first signals through the first plurality of wires of the first twisted pair; and a second chipset configured to send the plurality of second signals through the second plurality of wires of the second twisted pair.

22. The system of claim 20, wherein the central DSL transceiver unit comprises a chipset configured to:

receive the plurality of first signals through the first plurality of wires of the first twisted pair; and send the plurality of second signals through the second plurality of wires of the second twisted pair.

23. The system of claim 20, wherein the remote DSL transceiver unit comprises:

a first chipset configured to receive the plurality of first signals through the first plurality of wires of the first twisted pair; and a second chipset configured to send the plurality of second signals through the second plurality of wires of the second twisted pair.

24. The system of claim 20, wherein the remote DSL transceiver unit comprises a chipset configured to:

receive the plurality of first signals through the first plurality of wires of the first twisted pair; and send the plurality of second signals through the second plurality of wires of the second twisted pair.

* * * * *